April 21, 1970

3,508,054

DOSIMETER WITH TRANSPARENT ELECTRODE

Filed April 14, 1966

*INVENTORS*
Rolf Hosemann
Günther Basler &
Manfred Schiekel

BY *Spencer & Kaye*

ATTORNEYS

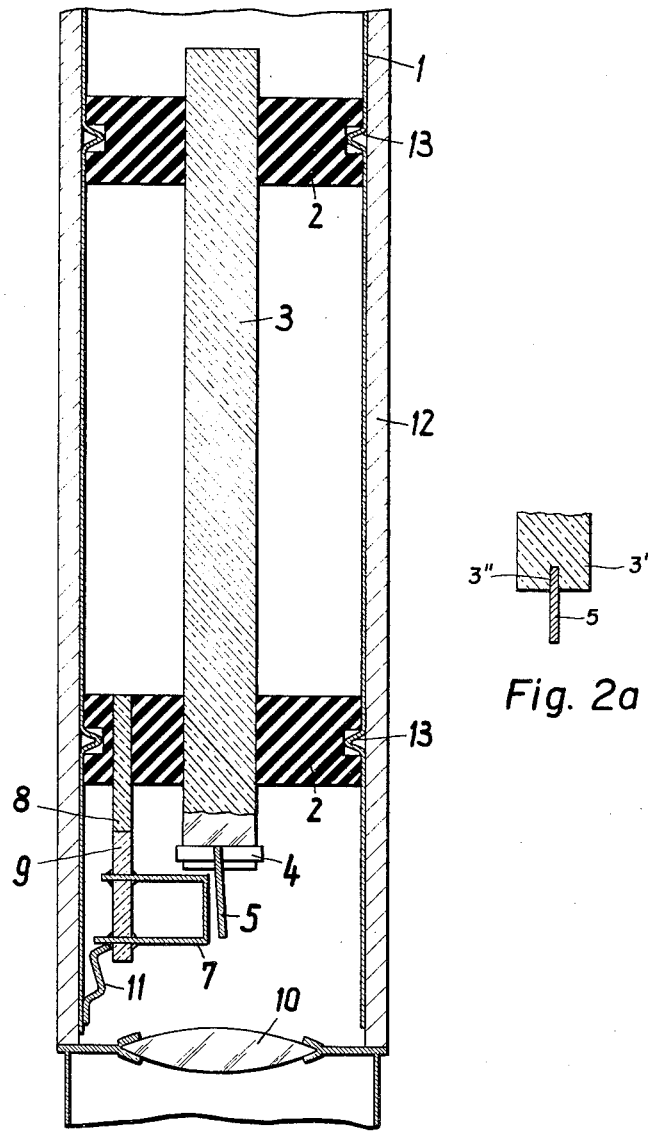

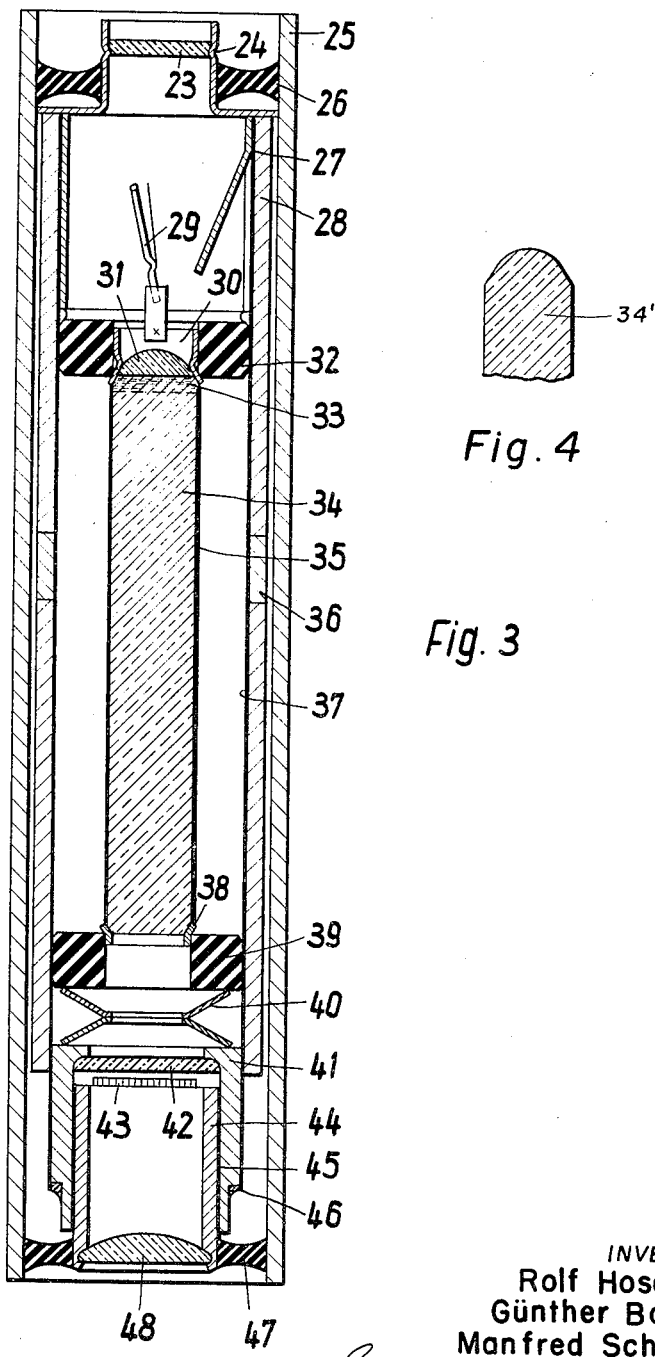

United States Patent Office 3,508,054
Patented Apr. 21, 1970

3,508,054
DOSIMETER WITH TRANSPARENT ELECTRODE
Rolf Hosemann and Günther Basler, Berlin, and Manfred Schiekel, Ulm (Danube), Germany, assignors to Telefunken Patentverwertungsgesellschaft m.b.H., Ulm (Danube), Germany
Filed Apr. 14, 1966, Ser. No. 542,589
Claims priority, application Germany, Apr. 15, 1965, T 28,398
Int. Cl. G01t 1/16; H01j 39/00, 39/12
U.S. Cl. 250—83.3
12 Claims

ABSTRACT OF THE DISCLOSURE

A dosimeter for measuring radiation includes an outer cylinder constituting a first electrode, an inner transparent rod constituting a second electrode and arranged concentrically with respect to the cylinder, a movable electrometer mounted within the outer cylinder and adjacent one end of the inner rod whereby it may be observed by light passing through the transparent rod.

---

The present invention relates to a dosimeter for measuring the radiation dosages resulting from X-rays, gamma rays or neutron rays.

More particularly, the present invention relates to a dosimeter for measuring radiation of the above type, which dosimeter is composed of two concentrically arranged cylinders made of materials having different electron productivities and an electrometer which indicates the voltage between these two cylinders. In such a dosimeter, the electrometer is normally a so-called string-type electrometer, the arrangement being such that lateral deflections of the electrometer fiber can be observed.

Many such dosimeters are already known in the art. For example, German Patent No. 1,067,535, shows a dosimeter of this type in which the two electrodes are made of materials that are good conductors of electricity, the outer electrode being made of a metal and the inner electrode of a carbon material. A construction of this type has a number of drawbacks insofar as its manufacture is concerned, primarily because the inner electrode has to be arranged on a carrier tube in order to make it possible to allow the deflection of the electrometer fiber to be observed through this electrode. Another drawback of this form of construction is that it is difficult to maintain the inner electrode in a concentric position with respect to the outer electrode.

It is, therefore, a primary object of the present invention to provide an arrangement which overcomes the above drawbacks.

Another object of the present invention is to reduce the total number of component parts required for the construction of such a dosimeter.

A further object of the present invention is to provide such a dosimeter in which the inner electrode can easily be mounted in a permanent manner.

A still further object of the present invention is to reduce the total length of a dosimeter-microscope combination.

These and other objects of the present invention are achieved by the provision of a novel dosimeter for measuring radiation dosages produced by X-rays, gamma rays, or neutron rays. The dosimeter according to the present invention generally includes an outer cylinder and an inner glass rod arranged concentrically with respect to the cylinder. This rod is made of a material having a low average, effective atomic number and having an electron productivity which is different from that of the cylinder. The dosimeter according to the present invention also includes an electrometer having a movable element, such as a fiber, and arranged for causing the fiber to be deflected, in a direction which is observable along the axis of the cylinder, by an amount proportional to the voltage between the cylinder and the rod.

Such a glass rod can be made to constitute both the inner electrode for the dosimeter and a light conductor for illuminating the electrometer fiber. If desired, it can also be made to serve as the carrier for the electrometer support.

Additional objects and advantages of the present invention will become apparent upon consideration of the following description when taken in conjunction with the accompanying drawings in which:

FIGURE 2 is a partial, cross-sectional elevational view of a dosimeter arrangement according to the present invention.

FIGURE 2a is a detailed view of a modified element of the arrangement of FIGURE 2.

FIGURE 3 is a cross-sectional elevational view of another embodiment of the present invention.

FIGURE 4 is a detailed, cross-sectional view of a modified element of the arrangement of FIGURE 3.

Figure 1A:
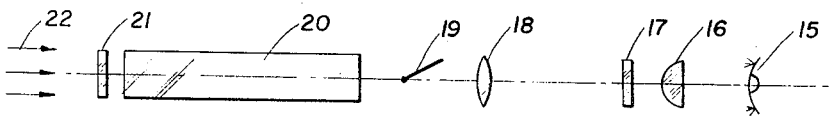
FIGURE 1a is a pictorial, elevational view of the basic elements of a first embodiment of the present invention.

Referring now to the drawings and first to FIGURE 1a thereof, the same shows incoming light entering the dosimeter, in an axial direction, through a window 21, the light being shown by the three arrows 22. A glass inner electrode rod 20 is arranged behind the window 21. Behind the electrode 20, taken in an axial direction, is the electrometer, represented in FIGURE 1a by the deflected electrometer fiber 19. Arranged behind the electrometer, again considered in an axial direction, is the microscope which allows the deflection of the electrometer fiber to be observed, this microscope comprising the objective 18, and further window 17 carrying a scale, and the eye piece 16. Also shown is a human eye 15, drawn in the axis of the dosimeter, from which it is apparent that the eye can see the incoming light which passes through the glass rod 20. The eye can thus observe lateral deflections of the electrometer fiber 19.

While the dosimeter arrangement shown in FIGURE 1a possesses many of the advantages of the present invention, it still has the drawback that its axial length will be unacceptably great for many applications. This great length results from the fact that the inner electrode 20, the electrometer and the microscope are arranged axially one behind the other. However, even this drawback can be eliminated simply by placing the inner electrode 20 between the microscope objective and the microscope eye piece and measuring scale in which case at least a portion of the optical paths in the microscope are formed within the inner electrode.

Figure 1B:
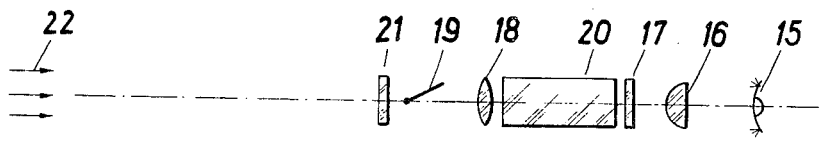
FIGURE 1b is a view similar to that of FIGURE 1a showing an improved embodiment of the present invention.

The relatively long construction shown in FIGURE 1a can be shortened by arranging the parts as shown in FIGURE 1b, wherein the glass rod 20 is disposed between the objective lens 18 and the eye piece 16. In such an arrangement, the glass constituting the rod 20 will be given optical qualities necessary for preventing distortions in the image, as seen by the eye 15, of the electrometer fiber 19.

In practice, the objective lens 18 may be secured directly to the end of the glass rod, preferably by cementing.

It may readily be seen that the arrangement of FIGURE 1b is considerably shorter than that of FIGURE 1a.

Turning next to FIGURE 2, which shows only a portion of the dosimeter and which is intended to show solely the arrangement of the electrodes as well as of the electrometer system, there are shown two concentrically arranged dosimeter electrodes, a rod 3 and an outer cylinder 12. Arranged within the electrode 12 is a further tube 1 which filters the electrons released from the electrode 12. The tube 1 is preferably made of an iron-nickel-cobalt alloy.

Inasmuch as the primary problem in such a dosimeter is to preserve a very high insulation resistance between the outer electrode, constituted by the cylinder 12, and the inner electrode 3, the inner electrode 3 is expediently mounted by means of one or more ring-shaped discs 2 made of quartz which are placed on the inner electrode and which are held in the outer electrode. The fact that the inner electrode 3 is made of glass makes it easier to secure the inner electrode on the quartz rings because these quartz rings can be fused or cemented to the glass rod 3. Such a dosimeter then has adequate insulation resistance between the inner and outer electrodes, this insulation resistance being of the order of magnitude of about $10^{20}$ ohm. This large isolation resistance enables the dosimeter to hold its charge over a relatively long period of time.

The glass rod constituting inner electrode 3 is preferably made of a soft glass. Glasses having the following compositions have been found to be particularly advantageous:

(1) A glass having a composition of approximately 83% $SiO_2$ and 17% $Na_2O$.

(2) A glass having a composition of approximately 75% $SiO_2$, 8% $Al_2O_3$ and 17% $Na_2O$.

It will be understood that the above are only exemplary, since many other glass compositions can be used.

The electrical conductivity of the above-mentioned glasses is sufficient to give the electrometer a low charging time constant. If desired, however, the glass can be made more conductive by suitable additives such as titanium oxide, for example. Moreover, the surface of the glass rod can be coated with a substance having a low atomic number. Suitable for this purpose, for example, are graphite, Be or Ti. These coatings can be applied by vaporizing them on the rod in thin layers, in order to give the surface of the glass rod a sufficiently high conductivity.

If a string-type electrometer is used, the frame of this string-type electrometer can be secured to the end face of the glass rod, for example, by fusing. In this way, the capacitance of the electrometer will be maintained at a low value and a preassembled and completed adjustable unit incorporating the inner electrode and the electrometer will be obtained. As a result, the complete apparatus will include a smaller number of component parts and, hence, will be less expensive to produce.

The inner electrode consisting of glass rod 3 is mounted in the embodiment of FIGURE 2, in two annular discs 2 made of quartz, these discs 2 being provided with circular cut-outs. The quartz discs are secured against axial movement by creases 13 which are pressed into the tube 1 and which extend into annular grooves formed in the outer wall of discs 2. The glass rod 3 is secured to the quartz discs 2 by fusing or cementing. A ring 4 made of light metal is seated on one end of the glass rod 3, for example, by being fused or cemented thereto, this ring 4 carrying the frame of the electrometer. In the illustrated embodiment, the electrometer is a string-type electrometer, that is to say, an electrometer comprising a semicircular electrometer yoke 5 to which is secured a likewise semicircular loop of a metallized quartz fiber. In FIGURE 2, only the yoke 5 is visible since it is shown in profile, that is to say, the loops of yoke 5 and its fiber are at right angles to the plane of the drawing. The counter electrode of this electrometer may be formed by that part of the electrode 12 which is opposite the loop.

Unless the electrometer is one having a square characteristic, the electrometer is preferably provided with a counter electrode 7 which is supported by one of the quartz discs 2 by means of a glass rod made in two pieces, 8 and 9. The counter electrode is then conductively connected to the electrode 12, through the intermediary of tube 1, by means of a lead 11.

In order to maintain the requisite high insulation between the inner and outer electrodes, the rod holding the counter electrode 7 is preferably made of two pieces 8 and 9, the piece 8 being made of quartz and the piece 9 of glass. The two parts are fused to each other in an abutting manner. The quartz rod 8 can simply be fused into the quartz disc 2. The provision of a glass piece 9 offers the advantage that the counter electrode 7 can be easily secured thereto because all that is involved is a conventional glass to metal joint.

The deflection of the electrometer fiber is observed by means of the magnifying system incorporating the objective lens 10, which simultaneously serves to hermetically seal the vacuum chamber. Inasmuch as the inner electrode is made of glass, sufficient light is transmitted through the rod to allow the deflection of the electrometer fiber to be observed.

The structural details shown in FIG. 2 can be modified in that the electrometer yoke 5 may be connected directly to the end surface of the glass rod 3. All that has to be done to make this possible is to provide the end face of the glass rod with a groove into which the electrometer yoke is cemented. Such an arrangement is shown in FIGURE 2a wherein the end of glass rod 3' is provided with a suitable slot 3'' in which the electrometer yoke 5 is cemented.

The provision of an inner electrode made of glass presents the additional advantage that when the rod is heated up it will give off only exceedingly small amounts of gases. This is a definite advantage as compared to inner electrodes made of carbon as was heretofore the case, because such electrodes give off significant amounts of gases and vapors.

Referring now to FIGURE 3, there is shown a dosimeter in which the inner electrode is arranged between the objective lens and the eye piece of the microscope. The dosimeter of this embodiment comprises a hollow tube 25 within which the two electrodes of different electron productivities are arranged. The outer electrode is shown at 28 to consist of two sections separated by an electrode window 36. The inner surface of the electrode 28 carries a tube 37 made of chrome iron, the purpose of which is to filter the incoming radiation. This tube 37 is approximately 90 microns thick. The inner electrode consists of a glass rod 34 whose surface is coated with a layer 35 of a material having a low atomic number, for example, graphite, berillium, or titanium. The glass rod 34 is held coaxially within the outer electrode 28 by means of two quartz discs 32 and 39. A mounting 30, made of light metal, is inserted into the quartz ring 32. This mounting 30 serves to mount the electrometer 29 as well as the microscope objective lens 31. The metallic mounting 30 makes conductive contact with the graphite coating 35 that has been applied to the glass rod 34. If desired, the end of this glass rod is provided with a metal coating 33 which overlaps the graphite coating 35 at the end of cylindrical wall of rod 34. The objective lens 31 can then be held either by means of the appropriately configured ring 30 or by being placed directly on the end face of the glass rod 34, for example, by cementing.

The other end of the glass rod 34 is held by the other quartz ring 39, through the intermediary of a ring 38 made, for example, of aluminum, this quartz ring 39 bearing, through the intermediary of annular cup springs 40, against a window tube 41 made of a metal alloy such as an iron-nickel-cobalt-alloy. The tube 41 is connected to a lens mount 44 by a layer 45 of cement. The tube 41 is connected to the tube 37 by a solder connection 46. Finally, this lens mount is held in the outer hollow tube 25 by means of a silicon rubber joint 47. The window tube 41 serves to carry, at one end, the window 42 to which the ocular scale 43 is applied and, at the other end, the microscope eye piece 48.

A tube 24 which carries a window 23 for the entry of light to illuminate the electrometer is inserted in the opposite end of the hollow tube 25. A tubular insert 27, which may be provided with a calibrating tongue, is welded to the tube 24. The tubular insert also serves as the housing for the electrometer 29. The insert 27 is connected to the tube 25 by means of a silicon rubber joint 26 in the same way in which the tube 44 is secured to the tube 25 at the opposite end.

A dosimeter having the form of construction shown in FIGURE 3 can be constructed, for example, to have a total length of the order of 60 mm. (2.5 inches) and a diameter of the order of 13 mm. (0.5 inch).

The embodiment of FIGURE 3 is constructed so that the major portion of the light path between lenses 31 and 48 extends through rod 34 and the distance between the lenses is adjusted to permit the intermediate image of the fiber to lie in the plane of scale 43 and to permit the final image of the fiber and scale 43 to be sharply focussed by the eye of the observer.

The above-described structure can be simplified still further by forming the glass rod and the microscope objective lens from a single piece of glass having the form shown in FIGURE 4. This can be easily accomplished by grinding the end of rod 34' to give it the required curvature.

It will be understood that the above description of the present invention is susceptible to various modifications, changes, and adaptations, and the same are intended to be comprehended within the meaning and range of equivalents of the appended claims.

What is claimed is:

1. A dosimeter for measuring radiation dosages produced by X-rays, gamma rays, or neutron rays, comprising, in combination:
   (a) an outer cylinder constituting a first electrode;
   (b) an inner transparent rod constituting a second electrode, mounted concentrically within said cylinder and made of a material having an electron productivity which is different from that of said cylinder;
   (c) an electrometer having a movable element; and
   (d) means mounting the said electrometer element adjacent one end of the transparent rod for movement in response to changes in radiation in the adjacent area in a position in which it may be viewed with the aid of light passing through said transparent rod.

2. An arrangement as defined in claim 1 further comprising a microscope positioned to permit the observation of deflections of said element and including an objective lens disposed at one end of said transparent rod and an eye piece disposed at the other end thereof, said rod being arranged in the optical path of said microscope.

3. An arrangement as defined in claim 2 wherein said objective lens is directly cemented to that end of said transparent rod which faces said electrometer.

4. An arrangement as defined in claim 2 wherein said objective lens is integral with said transparent rod.

5. An arrangement as defined in claim 1 further comprising: a filter tube mounted within said outer cylinder; and at least one annular quartz disc mounted in said filter tube, said transparent rod being held in the central opening of said disc.

6. An arrangement as defined in claim 5 wherein said rod is of glass and fused to said disc.

7. An arrangement as defined in claim 5 wherein said rod is cemented in said disc.

8. An arrangement as defined in claim 1 wherein said transparent rod is made of a material composed of approximately 83% $SiO_2$ and 17% $Na_2O$.

9. An arrangement as defined in claim 1 further comprising a layer of material having a low average atomic number covering the surface of said glass rod, said layer being made of a material chosen from the group consisting of graphite, berillium and titanium.

10. An arrangement as defined in claim 1 wherein said rod is provided with a slot at one end thereof and said electrometer is cemented in said slot.

11. An arrangement as defined in claim 1 wherein said transparent rod is made of glass.

12. An arrangement as defined in claim 5 in which there is a spaced annular quartz disc mounted adjacent each end of the transparent rod.

References Cited

UNITED STATES PATENTS

| 2,866,099 | 12/1958 | Coulson. |
| 2,881,326 | 4/1959 | Lynch. |
| 3,110,808 | 11/1963 | Fauser et al. |

FOREIGN PATENTS

| 808,775 | 2/1959 | Great Britain. |

ARCHIE R. BORCHELT, Primary Examiner

S. ELBAUM, Assistant Examiner

U.S. Cl. X.R.

250—277; 350—96